United States Patent [19]

Marchionni et al.

[11] Patent Number: 4,664,766

[45] Date of Patent: May 12, 1987

[54] PHOTOCHEMICAL PROCESS FOR NEUTRALIZING PERFLUOROPOLYETHERS

[75] Inventors: Giuseppe Marchionni, Milan; Gian T. Viola, Ravenna, both of Italy

[73] Assignee: Montedison S.p.A., Milan, Italy

[21] Appl. No.: 827,141

[22] Filed: Feb. 7, 1986

[30] Foreign Application Priority Data

Feb. 13, 1985 [IT] Italy .............................. 19498 A/85
Feb. 13, 1985 [IT] Italy .............................. 19499 A/85

[51] Int. Cl.$^4$ .......................... B01J 19/12; C02F 1/32
[52] U.S. Cl. .......................... 204/157.92; 204/158.21; 210/748
[58] Field of Search ...................... 204/157.92, 157.94, 204/158.21, 157.95, 157.97, 158.1; 210/748

[56] References Cited

U.S. PATENT DOCUMENTS

| | | | |
|---|---|---|---|
| 3,214,478 | 10/1965 | Milian | 204/157.94 |
| 3,849,504 | 11/1974 | Mitsch | 204/157.92 |
| 4,077,857 | 3/1978 | Toy et al. | 204/157.92 |

*Primary Examiner*—Howard S. Williams
*Attorney, Agent, or Firm*—Stevens, Davis, Miller & Mosher

[57] ABSTRACT

Neutralization of perfluoropolyethers is accomplished by reacting them with gaseous fluorine in the presence of radiations having a wavelength from 200 to 300 nm. The presence of radiations permits to operate at lower temperatures and with higher reaction rates, and to reach an exhaustive neutralization.

4 Claims, No Drawings

PHOTOCHEMICAL PROCESS FOR NEUTRALIZING PERFLUOROPOLYETHERS

THE PRESENT INVENTION

This invention relates to a process for purifying perfluoropolyethers, and in particular for neutralizing end groups of acid nature and of ketonic nature, which are present in the molecule of such compounds.

BACKGROUND OF THE INVENTION

Perfluoropolyethers are products known in the technique. The preparation thereof is described in particular in British Pat. Nos. 1,104,482, 1,153,306, 1,189,337, 1,217,871 and in U.S. Pat. No. 3,242,218.

From British Pat. No. 1,226,566 it is known how to neutralize the abovesaid end groups by reaction with fluorine at temperatures ranging from 50° to 250° C., and, more in general, from 100° to 200° C.

According to this technique, the reaction rate is generally very low. However it can be raised by increasing the temperature. Such increase in temperature causes, however, the loss of low molecular weight products owing to entrainment by the fluorine which bubbles in the liquid product. Due to the reasons mentioned hereinabove, therefore it is not possible, by operating according to this technique, to neutralize low molecular weight products, such as, for example, perfluoroalkyls of type $R_fCOF(R_f=-CF_3, -C_2F_5, -C_3F_7$ and the like) or low molecular weight perfluoropolyethers, such as those, for example, which are prepared through the known process of degrading perfluoropolyethers by means of Lewis acids.

Alternative technological solutions such as fluorination under pressure are hazardous and difficult to carry out owing to the characteristics of the halogen. In most of cases, the fluorination at high temperatures does not permit to achieve a complete neutralization, unless very high reaction times, which are not consistent with a usual commercial-scale process, are employed. In a process of such type, the profitability limit is generally bound to the obtainment of a neutralization degree of $5.10^{-4}$ m.eq. COF/g of fluorinated product, such value representing in practice the lowest sensitivity limit in the acidimetric analysis.

On the other side, the removal of the end groups of the acid fluorine type by means of KOH at temperatures ranging from 130° to 250° C., optionally to be carried out in an autoclave for the low molecular weight products, involves the introduction of hydrogen atoms into the end groups, what gives rise to formation of undesirable group of type $-CF_2H, -CFH-CF_3$.

DESCRIPTION OF THE INVENTION

The Applicants have now surprisingly found that it is possible to reach an exhaustive neutralization, along with a considerable increase in velocity, of the perfluoropolyethers having structures 1 through 7 described hereinbelow, by causing the reaction with elemental fluorine to occur at temperatures remarkably lower than those of the prior art fluorination process and preferably between −40° and +100° C., under conditions in which the perfluoropolyethers are irradiated by radiations ranging from 200 nm to 500 nm.

Radiations of the abovesaid type are obtainable for example by means of a mercury-vapour lamp (e.g. of the type Hanau TQ 150) or a noble gas discharge lamp (for example of the type PEK INC. X-75).

When operating with such a fluorine flow that the solution of the products to be neutralized is saturated at the operating temperature, it has been found that the neutralization rate is practically independent of the temperature.

Thus, this technique makes it possible to neutralize also low molecular weight, and therefore volatile products up to values lower than $5.10^{-4}$ m.eq.COF/g of perfluoropolyether at temperatures which may be by far lower than the boiling points of the products to be neutralized, with excellent yields and high conversion rates. Such technique is advantageously utilized for example in the exhaustive neutralization of perfluoropolyethers previously partially neutralized according to prior art methods and having residual acidity of $5.10^{-4}$ m.eq. COF/g of perfluoropolyether or more.

The perfluoropolyethers concerned by this neutralization technique are preferably the following ones:

  (1)
  (2)
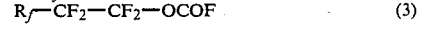  (3)

  (4)

  (5)

  (6)

  (7)

wherein $R_f$ represents a perfluoropolyether group of the following classes:

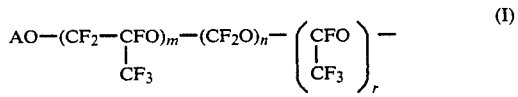  (I)

  (II)

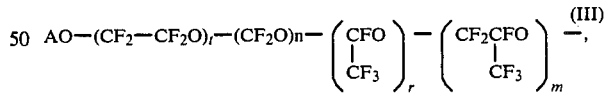  (III)

A being $-CF_3$ or $-C_2F_5$ or $-C_3F_7$ or $-CF(CF_3)_2$; m and n and r being integers higher than zero and not higher than 50; t and p being integers higher than zero and not higher than 200; the perfluoroxyalkylene units with indexes m, n, r, t and p, being randomly distributed along the perfluoropolyether chain.

The neutralized products obtained according to the process of the invention show the types of neutral end groups which are obtained by the conventional fluorination process at high temperature and in absence of radiations, that is perfluoralkyl groups, in particular perfluoromethyl or perfluoroethyl groups.

The following examples are given to illustrate the present invention without being however a limitation thereof.

The determination of the amount of residual acid functional groups still present after fluorination, according to the following examples, was carried out by treating the perfluoropolyethers with KOH at temperatures from 130° to 230° C., according to which all the present acid functional groups are removed, with formation of hydrogenated end groups of the type —$CF_2H$ and —CFH—$CF_3$. The sample so treated was subjected to nuclear magnetic resonance analysis of the proton by using a Varian spectrometer XL-200 operating in Fourier transformate at 200 MHz.

The capability of storing for many hours the signals relating to the proton permits to this instrument to have a sensitivity of the order of 0.05 ppm of H for 10 hours of storing.

In such manner it is possible to quantify the hydrogen content present in the molecule and to go back, from this, to the available acid functional groups; furthermore, the full absence of the signal relating to the two hydrogenated end groups guarantees a hydrogen amount by far below the limit of 0.05 ppm.

EXAMPLE 1 (comparative test).

500 g of perfluoropolyether having acid terminal groups were prepared according to the process disclosed by U.S. Pat. No. 3,242,218 at temperature of −30° C., in the presence of CsF and starting from perfluoropropene epoxide in solution in diethylenglycoldimethylether. The product has been subsequently purified through fractional distillation, obtaining 410 g of a product having the structure $C_3F_7OCF(CF_3)CF_2OCF(CF_3)COF$ (boiling point=116° C.) and a purity of 99.1%.

100 g of such product were introduced into a glass reactor maintained at a temperature of 20° C., equipped with a stirrer, a bubbler, a cooler, a $CO_2$ trap, and they were exposed to the action of elemental $F_2$, fed to the reactor at a flowrate of 10 l/h, during a total time of 40 h.

After such period, 94 g of product were collected which, on gaschromatographic analysis, revealed to consist for 6% of neutralized product, and of the remaining amount of product which had not reacted.

An analogous sample, treated under the same operative conditions described hereinabove, but at a temperature of 60° C., provided, after a 40-hour feeding of fluorine, a conversion to neutralized product equal to 2% with weight losses due to the treatment, equal to 13%.

EXAMPLE 2

Using a photochemical reactor having a maximum capacity of 100 cc, equipped with a quartz sheath for housing a mercury vapour lamp Hanau TQ 150 or a noble gas discharge lamp PEK INC. X-75, and furthermore equipped with a bubbler, a magnetic stirrer, a $CO_2$ trap and a thermoregulation system for both the reactor and the sheath system, utilizing perfluorinated liquids, neutralization tests according to the following modalities were conducted: 100 grams of the perfluoropolyether prepared according to example 1 were placed into the photochemical reactor and were tested with elemental fluorine at room temperature with switched off lamp in order to fully remove traces of organic solvents, if still present.

Subsequently, after switching on the lamp, it was proceeded to fluorination with a fluorine flow equal to 10 l/h.

In this case too the reaction was followed by means of gaschromatograhic analysis, as is described in example 1.

The conversion rate proved to be independent of the temperature at which the test was carried out, and in all cases it resulted considerably increased with respect to the similar tests carried out in the absence of radiation.

In particular there were carried out four tests according to the same operative modalities, at temperatures of −20°, 0°, 20° and 60° C., which provided conversions to neutral products corresponding to 60% after 4 hours and 30 minutes, and to 90% after 6 hours.

No weight losses were found for the tests carried out at −20° C. and at 0° C.; such losses were equal to 1.1% for the test carried out at 20° C. (after a 6-hour exposure) and to 2% for the test carried out at 60° C. (after a 6-hour exposure).

EXAMPLE 3 (comparative test)

By operating according to the method described in British Pat. No. 1,104,482, 3500 g of acid perfluoropolyether fluoride were prepared by photo-oxidation of perfluoropropene at −40° C.

The subsequent heat treatment at a temperature of 230° C. provided 3100 g of a product prevailingly consisting of a ketone mixture having general formula

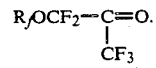

From such mixture there were obtained, by rectification, 560 g of perfluoropolyether of formula:

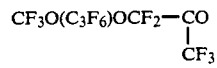

(boiling point=137° C.), with a purity equal to 94.3%. The perfluoropolyether structure was confirmed through I.R. and N.M.R. analyses.

100 g of this product were treated with elemental $F_2$ in a reactor in like manner as described in example 1.

After a 40-hour feeding of fluorine, 97 g of product were collected, whose conversion to neutral perfluoropolyether was equal to 10%.

A further amount of 100 g of the same rectified product was treated according to the same modalities at a temperature of 60° C., whereby obtaining, after 40 hours, 90 g of product converted for 16% to neutral product.

EXAMPLE 4

By using the same photochemical reactor and by operating according to the same modalities as described in example 2, 100 g of the rectified product obtained according to example 3 were treatd with elemental fluorine.

Three different tests carried out at temperatures of 0°, 20° and 60° C. provided conversions (after a 9-hour irradiation) equal to 75%, independently of the temperature. The 90% conversion was attained after 20 hours of irradiation.

No weight losses were ascertained for the test carried out at 0° C., while for the test carried out at 20° C. the weight loss was of 9.6% (after 20 hours). For the test carried out at 60° C. such loss was of 14% (after 20 hours).

EXAMPLE 5

By starting from perfluoropropene and by operating conforming to the method described in British Pat. No. 1,104,482 a perfluoropolyether was prepared, which was then subjected to catalytic degradation by means of $\gamma_c$ AlF$_3$ (according to what is described in Italian patent application No. 21052 A/84, in the name of the Applicant), thus obtaining a sample of perfluoropolyether weighing 450 g and having a viscosity of 5 cSt.

The NMR analysis revealed for such product a mean numeral molecular weight equal to 658 u.m.a.; furthermore the product proved to contain acid end groups of type —OCF(CF$_3$)COF in an amount equal to 12% by moles, and ketonic end groups of type,

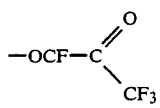

in an amount equal to 4% by moles.

100 g of this product were treated, following the modalities described in example 1, with F$_2$ (fed at a rate of 10 l/h) at a temperature of 60° C. After a 40-hour reaction, the neutralization degree measured by acidimetric titration (Kravcenko N.N. et al. U.D.K. 541/64) was lower than 5%. The weight loss was of 1.15%.

A test carried out on a second portion of 100 g in a photochemical reactor, according to the modalities of example 2 and at a temperature of 60° C. provided, after a fluorine feeding for 8 hours at a rate of 10 l/h, a degree of conversion to neutral product equal to 95%, the weight losses being equal to 0.8%.

EXAMPLE 6

100 g of perfluoropolyether having a viscosity of 105 cSt and an acidity corresponding to 40 mg of KOH/g of oil, prepared by photo-oxidation of perfluoropropene and subsequent themal treatment (according to the process described in British Pat. No. 1,104,482), were treated, using the equipment described in example 2, with elemental F$_2$ in amounts of 10 l/h, using a Xenon lamp type PEK. INC. X-75. Such perfluoropolyether exhibited end groups of the type R$_f$OCF$_2$—CF$_3$, R$_f$OCF$_3$.

After a 3-hours irradiation at a temperature of 40° C. the total acidity of the mixture measured by acidimetric titration was of 0.8 mg KOH/g of oil, with a weight loss equal to 0.5%.

A second portion of 100 g of the same product having a viscosity of 105 cSt and an acidity equal to 40 mg of KOH/g of oil was treated, using the equipment described in example 1, at a temperature of 40° C. with a fluorine flow of 10 l/h. After 20 hours the product exhibited an acidity of 26 mg of KOH/h of oil, with weight losses of the order of 1.5%.

The product so obtained was further treated with F$_2$ in the reactor described in example 1, raising the temperature to 130° C. and maintaining it during further 20 hours. At the end of the reaction the total acidity was equal to 5 mg KOH/g of oil, while the weight loss was of the order of 12%.

EXAMPLE 7

By photo-oxidation of tetralfuoroethylene in a CF$_2$Cl$_2$ solution at a temperature of $-40°$ C. and by subsequent thermal treatment there were prepared 540 g of acid perfluoropolyether fluoride (containing end groups of the type —CF$_2$COF, —CF$_2$OCOF and having a numeral mean molecular weight of 8500 and an acidity of 7.6 mg of KOH/g of oil).

A 100-gram portion of such product was placed into a reactor, as described in example 1, and was treatd with elemental fluorine (10 l/h) at a temperature of 140° C. After a 30-hour reaction there were obtained 93 g of product having a residual acidity equal to 1.6 mg KOH/g of oil.

A second 100-gram portion of product, after having been placed into the photochemical reactor described in example 2, was treated with elemental fluorine (10 l/h) at a temperature of 50° C. After a 8-hour reaction there were obtained 98 g of product having a residual acidity equal to 0.9 mg KOH/g of oil.

EXAMPLE 8

600 g of perfluoropolyether having a numeral mean molecular weight of 2260, a viscosity of 106 cSt and an acidity equal to 0.4 m.eq. COF/g of oil, were obtained by photo-oxidation of perfluoropropene at a temperature of $-40°$ C. according to what is described in British Pat. No. 1,104,482, and by subsequent thermal treatment at 150° C. in order to remove the peroxide functional groups. The product was divided into three samples (a), (b), (c) weighing 200 g each.

Sample (a) was introduced into a glass reactor equipped with a cooler, a bubbler, a stirrer, a CO$_2$ trap, a temperature regulating system, where it underwent a fluorination at a temperature of 160° C. during 25 hours in the aggregate.

Obtained were 170 g of perfluoropolyether having a viscosity of 115 cSt and an acidity, measurable through the conventional acidimetric titration methods, equal to $7.6 \times 10^{-4}$ m.eq. of COF/g of oil.

Two portions of such product weighing 80 g each were treated with KOH at a temperature of 230° C. during 6 hours under stirring.

The product was filtered on a membrane (pore diameter=0.45 μm) and subjected to NMR analysis of the proton by using a 200 Mc apparatus, type Varian XL-200, operating in Fourier transformate with storing times of 4 hours.

The hydrogen amount contained in the perfluoropolyether as end groups —CF$_2$H and —CF$_2$H and —CFH—CF$_3$, resulted to be, for both examined samples, practically the same and equal to 0.8 mg H/kg of oil. This amount was corresponding to a residual acidity in the fluorinated sample equal to $8 \times 10^{-4}$ m.eq. COF/g of oil, wath is well in accordance with the direct acidimetric measurement.

Sample (b) was subjected to fluorination during 40 hours according to the same modalities employed for sample (a). The final product, having a viscosity of 113 cSt., exhibited, after treatment with KOH, a hydrogen content equal to 0.2 mg H/kg, what was corresponding to a residual acidity of $2 \times 10^{-4}$ m.eq. COF/g of oil of fluorinated sample not measurable by the usual acid-base titration methods.

Sample (c) was introduced into a photochemical reactor having a capacity of 150 cc, equipped with quartz sheaths for housing a mercury-vapour lamp (Hanau TQ 150) or a noble gas discharge lamp (PEK.INC. X-75), and furthermore equipped with a bubbler, a magnetic stirrer, a $CO_2$ trap and a thermoregulation system of both the reactor and the sheath system, operating with perfluorinated liquids.

The reaction was carried out by irradiating the reagent system at a temperature of 40° C. for a time of 12 hours. The final product, having a viscosity of 109 cSt, did not exhibit, after the treatment with KOH, any presence of hydrogen when it was subjected to NMR analysis with storing times up to 10 hours. That revealed that an exhaustive neutralization of perfluoropolyether occurred.

EXAMPLE 9

200 g of perfluoropolyethers having a numeral mean molecular waight of 745 u.m.a., prepared by catalytic degradation with $\gamma_c$ $AlF_3$ of a neutral product having a numeral mean molecular meight of 4250 u.m.a., according to the method described in Italian patent application No. 21052 A/84 and having a total acidity equal to 0.03 meq. COF/g of oil, were introduced into a reactor of the same type as described in example 8 for sample (c).

The reaction was conducted by feeding $F_2$ (10 l/h) and maintaining the liquid at a temperature of 40° C. during 13 hours in total. At the end of the test, 195 g of product were collected, which, subjected to analysis by acidimetric titration, revealed to be neutral.

The product was transferred into a 250-cc autoclave made of monel, it was additioned with 10 g of KOH and maintained at a temperature of 230° C. during eight hours. After filtration (0.45 μm), the NMR analysis of the proton did not reveal any presence of hydrogenated end groups even with storing times of 10 hours. Therefrom it is inferable that a complete neutralization of the perfluoropolyether according to the technique described hereinabove did occur.

EXAMPLE 10

600 g of perfluoropolyether having a numeral means molecular weight equal to 8520 and a total acidity equal to 0.09 meq. COF/g of oil prepared by photo-oxidation of tetrafluoroethylene in $CF_2Cl_2$ at a temperature of $-40°$ C. according to what is known from British Pat. No. 1,104,482, and by a subsequent treatment at a temperature of 150° C. during 10 hours in order to remove the peroxy functional groups, were divided into three samples (a), (b), (c) weighing 200 g each.

Sample (a) was introduced into reactor analogous with the one utilized for sample (a) of example 8, where it was subjected to fluorination (with fluorine fed in amounts of 10 l/h) at a temperture of 160° C. for a total time of 25 hours. 190 g of a perfluoropolyether with a viscosity of 157 cSt. and an acidity still measurable by means of the usul volumetric analysis methods and equal to $7.5 \times 10^{-4}$ meq. KOH/g of oil were obtained. Neutralization with potash and the subsequent NMR analysis revealed that H was present, as end group $-CF_2H$, in an amount equal to 0.6 mg H/kg. This amount was corresponding to a residual acidity in the fluorinated sample equal to $6.10^{-4}$ meq/g, this being sufficiently well in accordance with the acidimetric determination.

Sample (b) was subjected, according to the same modalities employed for sample (a), to fluorination (10 l/h) during a total time of 40 hours. The final product, having a viscosity of 164 cSt, treated with KOH and then subjected to NMR analysis of the proton, exhibited a hydrogen content equal to 0.2 mg H/kg, which was corresponding to a residual acidity in the fluorinated sample equal to $2.10^{-4}$ meq/g.

Sample (c) was introduced into a photochemical reactor similar to the one described in example 8 for sample (c), and it was subjected to the action of fluorine (10 l/h) at a temperature of 40° C. by irradiating the reagents mixture during 10 hours. The NMR analysis of the proton effected on the sample treated with KOH did not reveal any presence of hydrogenated end groups. It is therefrom inferable that an exhaustive fluorination of perfluoropolyether according to the described technique took place.

What is claimed is:

1. A process for neutralizing perfluoropolyethers by reaction with elemental fluorine which consists in causing such reaction to occur in the presence of radiations having a wavelength from 200 to 500 nm.

2. The process according to claim 1, in which the perfluoropolyethers are comprised in one of the following formulas:

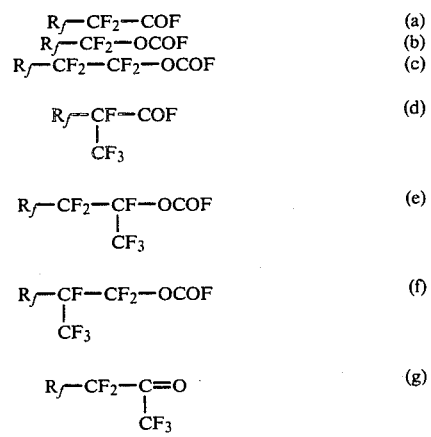

wherein $R_f$ represents a perfluoropolyether group of the following classes:

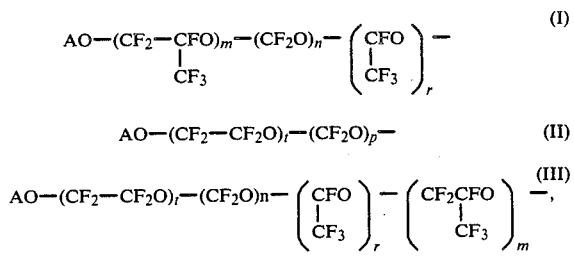

A being $-CF_3$ or $-C_2F_5$ or $-C_3F_7$ or $-CF(CF_3)_2$, m and n and r being integers higher than zero and not higher than 50; t and p being integers higher than zero and not higher than 200; the perfluoroxyalkylene units with indexes m, n, r, t and p, being randomly distributed along the perfluoropolyether chain.

3. The process according to claim 1 or 2, in which the reaction is conducted at temperatures ranging from $-40°$ C. to $+100°$ C.

4. The process according to claim 1 in which the starting perfluoropolyether has a residual acidity equal to or higher than $5.10^{-4}$ m.eq. $-COF/g$ of fluorinated product.

* * * * *